United States Patent
Hara et al.

(10) Patent No.: US 8,762,700 B2
(45) Date of Patent: Jun. 24, 2014

(54) STORAGE PROCESSING DEVICE AND PROGRAM

(75) Inventors: Yukihito Hara, Nagoya (JP); Jumpei Shimada, Nagoya (JP); Satoru Goto, Nagoya (JP)

(73) Assignee: Buffalo Inc., Nagoya-shi (JP)

(*) Notice: Subject to any disclaimer, the term of this patent is extended or adjusted under 35 U.S.C. 154(b) by 437 days.

(21) Appl. No.: 13/046,147

(22) Filed: Mar. 11, 2011

(65) Prior Publication Data
US 2011/0225411 A1    Sep. 15, 2011

(30) Foreign Application Priority Data
Mar. 12, 2010  (JP) ................................ 2010-056182

(51) Int. Cl.
G06F 15/177    (2006.01)
(52) U.S. Cl.
USPC .......................................................... 713/2
(58) Field of Classification Search
USPC .......................................................... 713/2
See application file for complete search history.

(56) References Cited

U.S. PATENT DOCUMENTS

| 5,822,582 A | 10/1998 | Doragh et al. |
| 7,100,036 B2* | 8/2006 | Schwartz .......................... 713/2 |
| 8,185,727 B2* | 5/2012 | Joshi et al. ........................ 713/1 |
| 2005/0022040 A1* | 1/2005 | Yamashita et al. ............. 713/300 |

FOREIGN PATENT DOCUMENTS

| JP | 5-100827 A | 4/1993 |
| JP | 2002-49487 A | 2/2002 |

OTHER PUBLICATIONS

Office Action issued Apr. 11, 2013 in Chinese Application No. 201110059983.2 (With English Translation).

* cited by examiner

*Primary Examiner* — Kim Huynh
*Assistant Examiner* — Eric Chang
(74) *Attorney, Agent, or Firm* — Oblon, Spivak, McClelland, Maier & Neustadt, L.L.P.

(57) ABSTRACT

The NAS 20 to which the removable hard disks 251 and 252 each storing an operating system are connected, assumes that the removable hard disk storing the signature of the NAS 20 stores an operating system executable on the NAS 20. Thus, the NAS 20 selects as a boot drive the removable hard disk storing the signature of the NAS 20 and then boots up the operating system stored in the boot drive thus selected.

6 Claims, 6 Drawing Sheets

STORAGE PROCESSING DEVICE AND PROGRAM

CROSS REFERENCE TO RELATED APPLICATION

This application is based upon and claims the benefit of priority from, the prior Japanese Patent Application No. 2010-56182 filed on Mar. 12, 2010; the entire contents of which are incorporated herein by reference.

BACKGROUND OF THE INVENTION

1. Field of the Invention

This invention relates to a storage processing device to which plural storage media each storing system information can be connected, and also relates to a program executed in the storage processing device.

2. Description of the Related Art

Recently, storage processing devices referred to as network attached storage (NAS) devices has become somewhat prevalent. The NAS device has plural hard disk drives and is capable of storing various kinds of content data such as video and audio in the hard disk drives. Immediately after the reception of a request for a content data from a terminal device via a network, the NAS device transmits the requested content data to the terminal device via the network. Then, the received content data is reproduced in the terminal device.

The plural hard disk drives of the NAS device store their operating systems, respectively. When the power is supplied to the NAS device, it selects one of the hard disk drives as a boot drive, and then boots up the operating system stored in the boot drive thus selected.

For example, Japanese Unexamined Patent Application Publication No. Hei 5-100827 (hereinafter, referred to as Patent Document 1) and Japanese Patent Application Publication No. 2002-49487 (hereinafter, referred to as Patent Document 2) disclose boot drive selection methods.

According to those Patent Documents, some of the NAS devices are so constructed that plural removable hard disks can be connected thereto. Such removable hard disks as connected to the NAS device are sometimes connected to a device other than to the NAS device and used along with the device. For this reason, an operating system fit for the NAS device is not necessarily stored in every removable hard disk. Accordingly, the NAS device needs to properly select an operable boot drive.

With the boot drive selection method described in Patent Document 1, however, the boot drive is selected in accordance with a switching operation performed by the user. The method involves the user operation and is thus troublesome. Moreover, with the boot drive selection method described in Patent Document 2, the boot drive is automatically switched to another drive when an abnormality occurs in the boot drive or a program written therein, in the middle of boot processing of the system. However, this boot drive selection method is not a proper boot drive selection method for booting up a proper operating system fit for the NAS device. In consideration of the aforementioned problem, the object of this invention is to provide a storage processing device and a program, which are capable of properly selecting a boot drive.

SUMMARY OF THE INVENTION

To solve the above-mentioned problem, this invention has the following features. According to a first feature of this invention, there is provided a storage processing device (NAS 20) to which plural storage media (removable hard disks 251, 252), each storing system information (operating system), are connectable, the storage processing device comprising, a boot processor (boot processor 203) for selecting as a boot drive the storage medium storing identification information (signature) of the storage processing device from among the plural storage media, and for booting the storage processing device on the basis of the system information stored in the boot drive thus selected.

The storage processing device as described above assumes that the storage medium storing the identification information of the storage processing device stores the system information executable on the storage processing device. The storage processing device thus selects the storage medium as the boot drive and boots up the storage processing device on the basis of the system information stored in the boot drive. Accordingly, the storage medium storing the system information executable on the storage processing device can be properly selected as the boot drive. According to a second feature of this invention, in the case where there are plural storage media each storing the identification information of the storage processing device, the boot processor selects as a boot drive the storage medium having the latest creation date (time stamp) of the system information stored therein from among the storage media each storing the identification information of the storage processing device.

The storage processing device with the above-described feature assumes that the storage medium storing the system information having the latest creation date stores the system information executable on the storage processing device. The storage processing device thus selects the storage medium as the boot drive and boots up the storage processing device on the basis of the system information stored in the boot drive. Accordingly, the storage medium storing the system information executable on the storage processing device can be properly selected as the boot drive.

According to a third feature of this invention, in the case where there is no storage medium storing the identification information of the storage processing device, the boot processor selects as a boot drive the storage medium having the latest creation date of the system information stored therein from among the plural storage media.

The storage processing device with the above-described feature assumes that the storage medium having the latest creation date of the system information stored therein stores the system information executable on the storage processing device. The storage processing device thus selects the storage medium as the boot drive and boots up the storage processing device on the basis of the system information stored in the boot drive. Accordingly, the storage medium storing the system information executable on the storage processing device can be properly selected as the boot drive.

According to a fourth feature of this invention, in the case where there are plural storage media having the same latest creation date of the system information stored therein, the boot processor selects as a boot drive the storage medium whose unique identification number (disk number) the storage processing device recognizes as satisfying a predetermined condition, from among the storage media having the same latest creation date and their unique identification numbers. According to a fifth feature of this invention, the storage medium further comprises a communication interface for outward communication, and the identification information recognized by the storage processing device is a MAC address assigned to the communication interface.

The storage processing device with the above-described features takes into account the fact that the MAC address is information allowing the communication interface (communication unit) to be uniquely specified. Thus, the storage processing device uses the MAC address assigned to the incorporated communication interface as the identification information of the storage processing device. Accordingly, it is possible to easily set the unique identification information without performing processing necessary to cause the identification information to be unique from those of other storage processing devices, for example.

According to a sixth feature of this invention, there is provided a program for causing a storage processing device to which plural storage media each storing system information are connectable to execute the steps of: selecting as a boot drive the storage medium storing identification information of the storage processing device from among the plural storage media; and booting the storage processing device on the basis of the system information stored in the boot drive thus selected.

According to this invention, it is possible to properly select the boot drive.

DESCRIPTION OF THE EMBODIMENTS

Figure 1:
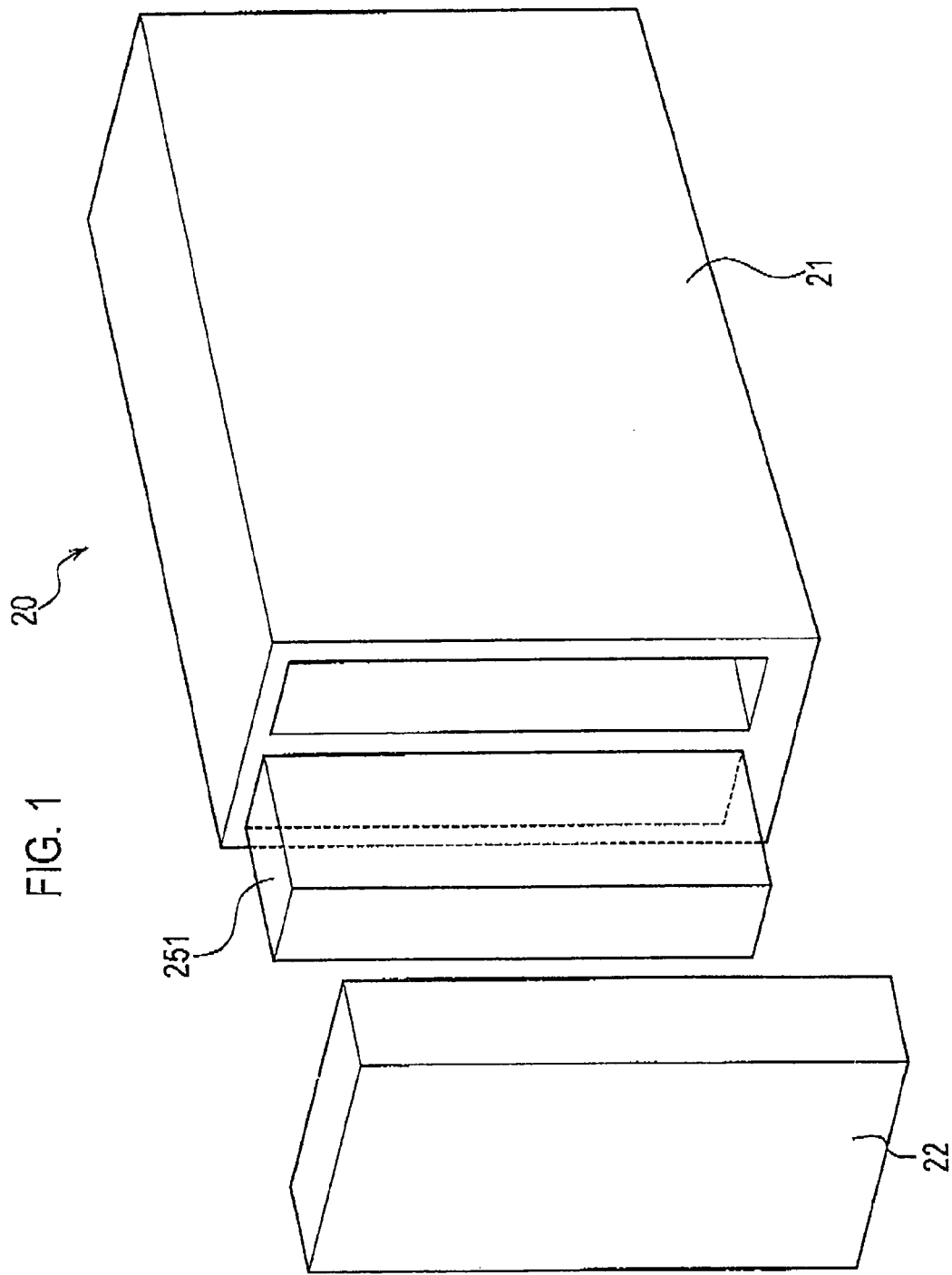
FIG. 1 is an external view of a NAS as an embodiment of this invention.

Embodiments of this invention will be described below with reference to the drawings. To be concrete (1) Configuration of NAS, (2) Operation of NAS, (3) Operation/Resulting effects, and (4) Other embodiments will be described in this order named. In the drawings of the embodiments, the same or similar reference symbols denote the same or similar parts.
(1) Configuration of NAS FIG. 1 is an external, perspective view of a NAS 20 according to an embodiment of this invention.

As shown in FIG. 1, the network attached storage (NAS) 20 has a main body 21 and a cover 22. Two removable hard disk drives are connectable to the NAS 20. FIG. 1 shows how a single removable hard disk 251 is connected.

Figure 2:
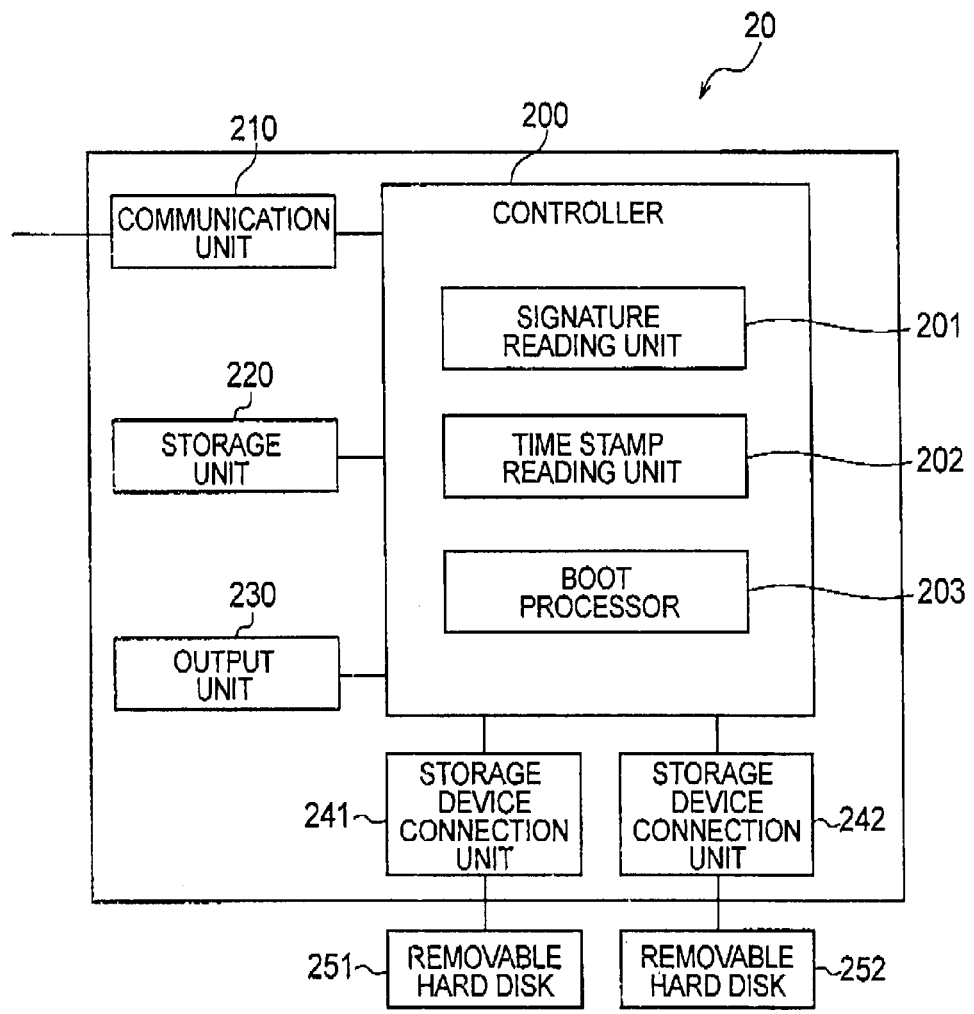
FIG. 2 schematically shows the configuration of the NAS shown as the embodiment of this invention in FIG. 1.

FIG. 2 schematically shows the overall configuration of the NAS 20. As shown in FIG. 2, the removable hard disks 251 and 252 are connected to the NAS 20. The NAS 20 includes a controller 200, a communication unit 210, a storage unit 220, an output unit 230 and storage device connection units 241 and 242.

The controller 200 includes a CPU, for example, and controls various functions included in the NAS 20.

The communication unit 210 is a LAN card, for example, and a media access control (MAC) address is assigned thereto. The communication unit 210 is a communication interface which communicates with external devices. For example, the communication unit 210 communicates with a DMP compliant television receiver (not shown) via a network.

The storage unit 220 includes NAND flash memories, for example, and stores various kinds of information used in control in the NAS 20. Typically, the storage unit 220 stores a boot loader.

The output unit 230 includes a speaker or LEDs, for example, and informs the operator of the status of executing exceptional processes.

The storage unit connection unit 291 is used for connection with the removable hard disk 251. The storage unit connection unit 242 is used for connection with the removable hard disk 252.

Figure 3:
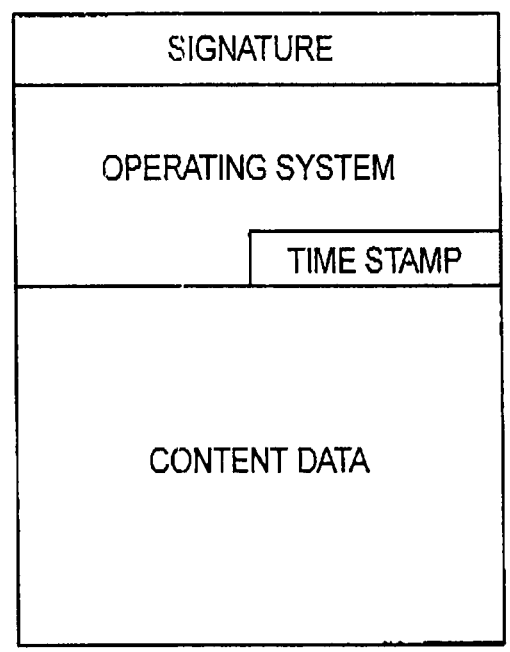
FIG. 3 is an illustrative example of the storage area configuration of each of removable hard disks according to this invention.

FIG. 3 schematically shows the storage area configuration of each of the removable hard disks 251 and 252 according to the embodiment of this invention. As shown in FIG. 3, each of the removable hard disks 251 and 252 includes storage areas for a signature, an operating system and a content data. Apart of the storage area for the operating system is a storage area for a time stamp.

The signature is the MAC address which was previously assigned to the communication unit 210 incorporated in the NAS 20, and which is written in the signature areas of the removable hard disks 251 and 252 in response to the initialization of the removable hard disks 251 and 252 by the NAS 20 after they have been connected with the NAS 20.

The operating system is information on the system to be booted up when the power supply of the NAS, which is connected with the removable hard disks 251 and 152, is turned on. The time stamp shows the date (year/month/date) on which the image file of the operating system is created. The content data is reproducible data such as video and audio programs.

The controller 200 includes a signature reading unit 201, a time stamp reading unit 202 and a boot processor 203. The signature reading unit 201, the time stamp reading unit 202 and the boot processor 203 are functional blocks whose functions are implemented when the controller 200 reads the boot loader from the storage unit 220 and then executes the boot loader.

The signature reading unit 201 reads the signature from each of the removable hard disks 251 and 252. The time stamp reading unit 202 reads the time stamp from each of the removable hard disks 251 and 252.

The boot processor 203 selects the removable hard disk 251 or 252 as a boot drive and then boots up the operating system stored in the boot drive thus selected.

Details are as follows. The boot processor 203 acquires the signature of the NAS 20. Here, the signature of the NAS 20 is the MAC address assigned to the communication unit 210. The boot processor 203 can acquire the MAC address by accessing the communication unit 210. Furthermore, the boot processor 203 compares the signature of the NAS 20 with the signature read from each of the removable hard disks 251 and 252 and then checks whether or not there is a removable hard disk storing the same signature as the NAS 20.

If there is a removable hard disk storing the same signature as the NAS 20, the boot processor 203 checks whether or not there is more than one removable hard disk storing the same signature as the NAS 20.

If there is only one removable hard disk storing the same signature as the NAS 20, the boot processor 203 selects as the boot drive the removable hard disk storing the same signature as the NAS 20.

If there is more than one removable hard disk storing the same signature as the NAS 20 (here, in the case where both of the removable hard disks 251 and 252 store the same signature as the NAS 20), the boot processor 203 compares time stamps respectively read from the removable hard disks 251 and 252 each storing the same signature as the NAS 20, and then specifies the latest time stamp. The boot processor 203 then checks whether or not there is more than one removable hard disk storing the latest time stamp.

If there is more than one removable hard disk storing the latest time stamp (here, in the case where the time stamps respectively read from the removable hard disks 251 and 252 are the same), the boot processor 203 selects as the boot drive the removable hard disk corresponding to the smaller of the disk numbers assigned to the removable hard disks 251 and 252. Here, the disk number is the identification information allowing the removable hard disk to be uniquely specified in the NAS 20, and is a number assigned to, for example, the slot in which the removable hard disk is connected to the NAS 20.

If there is only one removable hard disk storing the latest time stamp, the boot processor 203 selects as the boot drive the removable hard disk storing the latest time stamp.

If there no removable hard disk storing the same signature as the NAS 20, the boot processor 203 compares the time stamps respectively read from the removable hard disks 251 and 252, and then specifies the latest time stamp. The boot processor 203 then checks whether or not there is more than one removable hard disk storing the latest time stamp.

If there is more than one removable hard disk storing the latest time stamp (here, in the case where the time stamps respectively read from the removable hard disks 251 and 252 are the same), the boot processor 203 selects as the boot drive the removable hard disk corresponding to the smaller of the disk numbers assigned to the removable hard disks 251 and 252.

If there is only one removable hard disk storing the latest time stamp, the boot processor 203 selects as the boot drive the removable hard disk storing the latest time stamp.

When the boot drive is selected in accordance with the aforementioned boot drive selection processing, the boot processor 203 reads the operating system from the selected boot drive and boots up the operating system.

(2) Operation of NAS

Figure 4:
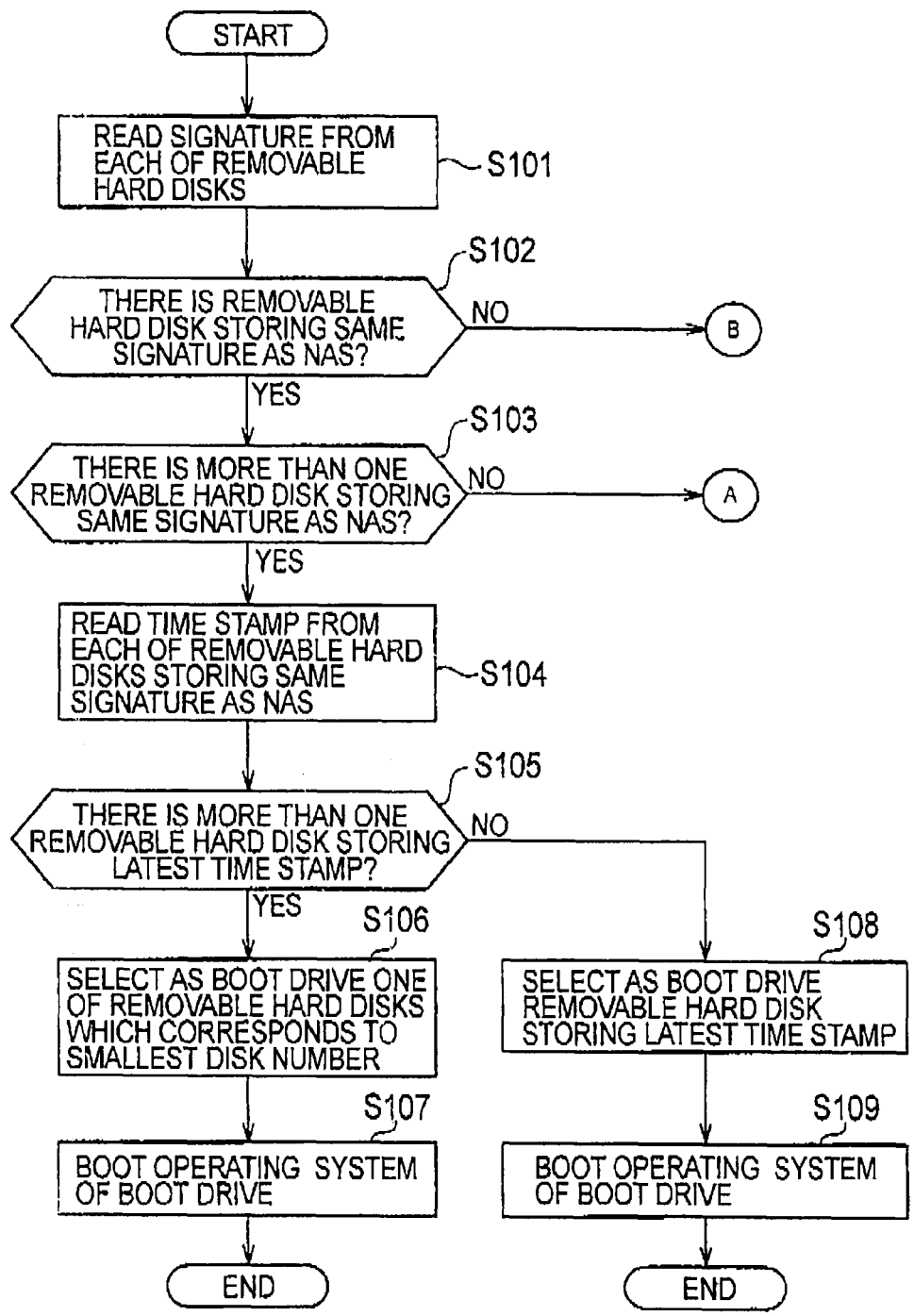
FIG. 4 is the flowchart of a first operation in the NAS as the embodiment of this invention.
Figure 5:
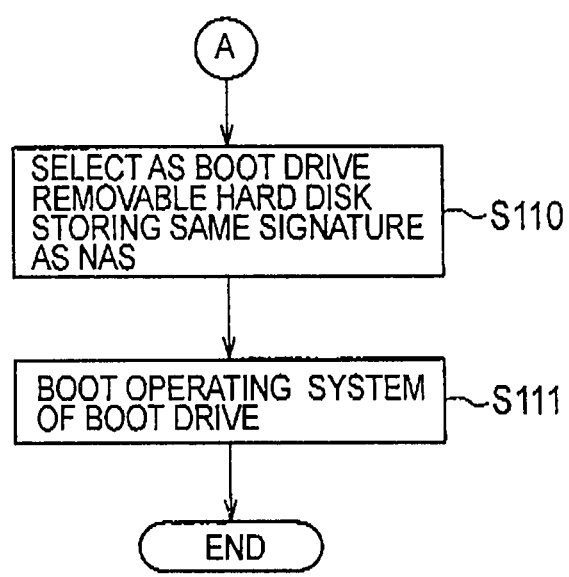
FIG. 5 is the flowchart of a second operation in the NAS as the embodiment of this invention.
Figure 6:
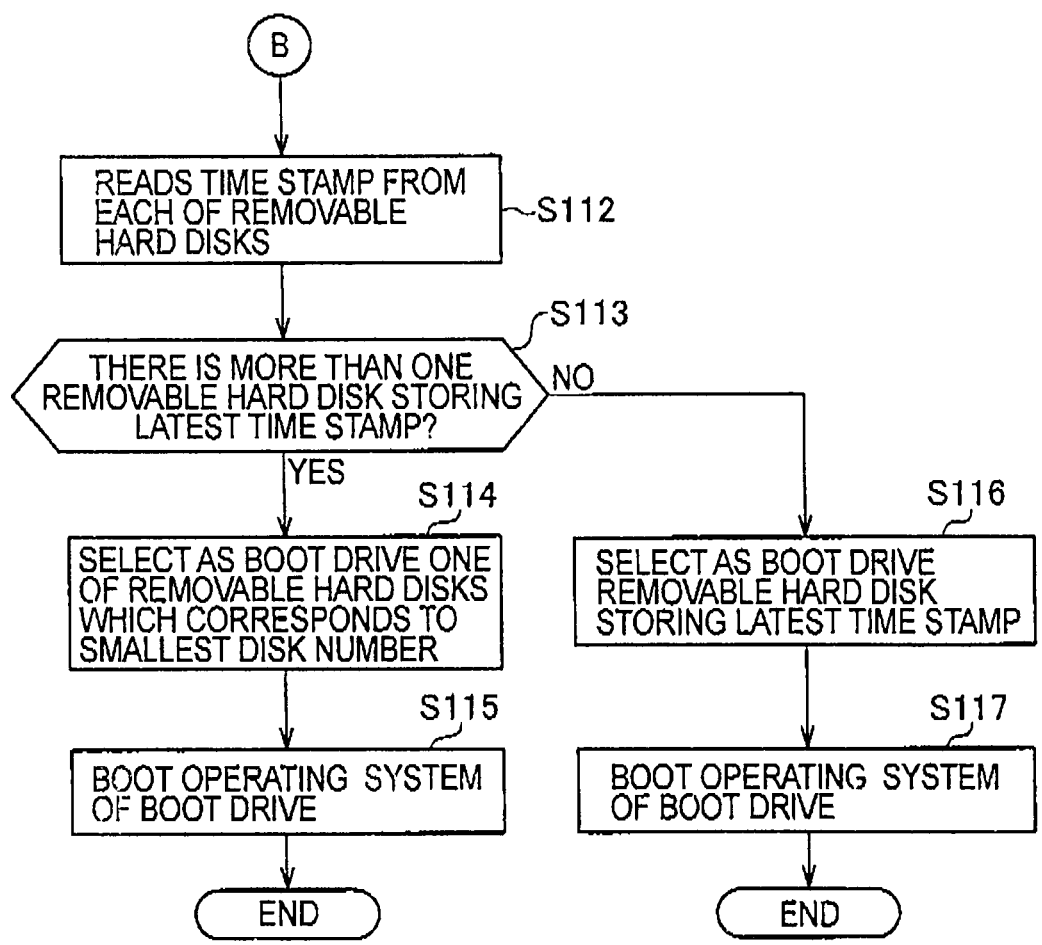
FIG. 6 is the flowchart of a third operation in the NAS as the embodiment of this invention.

Next, the operation of the NAS 20 will be described. FIGS. 4 to 6 are flowcharts illustrating the operation of the NAS 20.

In step S101 of FIG. 4, the signature reading unit 201 reads the signature from each of the removable hard disks 251 and 252.

In step S102, the boot processor 203 checks whether or not there is a removable hard disk storing the same signature as the NAS 20.

If there is a removable hard disk storing the same signature as the NAS 20, the boot processor 203 further checks in step S103 whether or not there is more than one removable hard disk storing the same signature as the NAS 20, that is, checks whether or not both of the removable hard disks 251 and 252 store the same signature as the NAS 20.

If both of the removable hard disks 251 and 252 store the same signature as the NAS 20, the time stamp reading unit 202 reads the time stamp from each of the removable hard disks 251 and 252 in step S104.

In step S105, the boot processor 203 checks whether or not there is more than one removable hard disk storing the latest time stamp, that is, checks whether or not both of the removable hard disks 251 and 252 store the same time stamp.

If both of the removable hard disks 251 and 252 store the same time stamp, the boot processor 203 selects as the boot drive one of the removable hard disks which corresponds to the smaller of the disk numbers assigned to the removable hard disks 251 and 252 in step S106.

In step S107, the boot processor 203 reads the operating system from the selected boot drive and boots up the operating system.

On the other hand, if it is judged in step S105 that the removable hard disks 251 and 252 do not store the same time stamp, that is, judged that one of the removable hard disks 251 and 252 stores the latest time stamp, the boot processor 203 selects as the boot drive the removable hard disk storing the latest time stamp in step S108.

In step S109, the boot processor 203 reads the operating system from the selected boot drive and boots up the operating system.

If there are no plural removable hard disks storing the same signature as the NAS 20 in step S103, that is, if it is judged that one of the removable hard disks 251 and 252 stores the same signature as the NAS 20, the boot processor 203 selects as the boot drive the removable hard disk storing the same signature as the NAS 20 in step S110 of FIG. 5.

In step S111, the boot processor 203 reads the operating system from the selected boot drive and boots up the operating system.

If it is judged in step 3102 that there is no removable hard disks storing the same signature as the NAS 20, the time stamp reading unit 202 reads the time stamp from each of the removable hard disks 251 and 252 in step S112 of FIG. 6.

In step S113, the boot processor 203 checks whether or not there is more than one removable hard disk storing the latest time stamp, that is, checks whether or not both of the removable hard disks 251 and 252 store therein the same time stamp.

If both of the removable hard disks 251 and 252 store the same time stamp, the boot processor 203 selects as the boot drive one of the removable hard disks which corresponds to the smaller of the disk numbers assigned to the removable hard disks 251 and 252 in step S119.

In step S115, the boot processor 203 reads the operating system from the selected boot drive and boots up the operating system.

If it is judged in step S113 that both of the removable hard disks 251 and 252 do not store the same time stamp, that is, judged that one of the removable hard disks 251 and 252 stores the latest time stamp, the boot processor 203 selects as the boot drive that one of the removable hard disks 251 and 252 which stores the latest time stamp in step S116.

In step S117, the boot processor 203 reads the operating system from the selected boot drive and boots up the operating system.

(3) Operation/Resulting Effect

In the embodiment of this invention, the removable hard disks 251 and 252 each storing an operating system are connected with the NAS 20 and that removable hard disk which stores the signature of the NAS 20 stores an operating system fit for the NAS 20. Thus, the NAS 20 selects as the boot drive the removable hard disk storing the signature of the NAS 20 and then boots up the operating system stored in the boot drive thus selected. Accordingly, the removable hard disk storing the operating system fit for the NAS 20 can be properly selected as the boot drive.

In the embodiment of this invention, if both of the removable hard disks 251 and 252 store the signature of the NAS 20, the NAS 20 assumes that the removable hard disk storing the latest time stamp stores the operating system fit for the NAS 20. Thus, the NAS 20 selects as the boot drive the removable hard disk storing the latest time stamp and then boots up the operating system stored in the selected boot drive. Accordingly, the removable hard disk storing the operating system fit for the NAS 20 can be properly selected as the boot drive.

In the embodiment of this invention, if both of the removable hard disks 251 and 252 do not store the signature of the NAS 20, the NAS 20 selects as the boot drive that one of the removable hard disks 251 and 252 which stores the latest time stamp and then boots up the operating system stored in the boot drive thus selected. Accordingly, the removable hard disk storing the operating system fit for the NAS 20 can be properly selected as the boot drive.

In the embodiment of this invention, if both of the removable hard disks 251 and 252 store the latest time stamp, the NAS 20 selects as the boot drive the removable hard disk having the smaller disk number and then boots up the operating system stored in the boot drive thus selected. Accordingly, the boot drive, which could not be selected according to the previous selection methods, can be eventually selected according to this last selection method. Since the NAS 20 essentially communicates with external devices, it includes the communication unit 210 to which the MAC address is assigned. This embodiment takes into account the fact that the MAC address is information the communication unit 210 to be uniquely specified. Thus, the MAC address assigned to the communication unit 210 is used in this embodiment as the signature which is the identification information of the NAS 20. Accordingly, it is possible to easily set the unique signature without performing processing necessary to cause the signature to be unique from those of other NAS devices, for example.

(4) Other Embodiments

As described above, the details of this invention have been disclosed by way of embodiment. However, it should not be understood that the description and drawings which constitute parts of this disclosure limit the invention. From this disclosure, various alternatives, examples, and operation techniques will be easily derived by those skilled in the art.

In the aforementioned embodiment, the NAS 20 selects as the boot drive the removable hard disk corresponding to the smaller disk number, but the method of selecting removable hard disks on the basis of e disk numbers is not limited to this embodiment. For example, the NAS 20 may select as the boot drive a removable hard disk corresponding to the larger disk number.

In the aforementioned embodiment, the removable hard disks 251 and 252 are connected to the NAS 20, but the recording medium to be connected to the NAS 20 is not limited to the removable hard disk. For example, a recording medium such as a solid state drive (SSD), a flash memory or an SD card may be connected to the NAS 20, and the operating system may be stored in such a recording medium.

As described above, this invention naturally includes various embodiments which are not described herein. Accordingly, the technical scope of this invention should be determined only by the claims.

The storage processing device and the program according to this invention are useful as a storage processing device and a program which can properly select a boot drive.

What is claimed is:

1. A storage processing device to which plural storage media each storing system information are connectable, the storage processing device comprising:
    a boot processor configured to select, as a boot drive, the storage medium to which identification information of the storage processing device is written by the storage processing device from among the plural storage media, and boot the storage processing device on the basis of the system information stored in the boot drive thus selected; and
    a communication interface configured to communicate with devices external to the storage processing device, wherein
    the identification information of the storage processing device is a MAC address assigned to the communication interface.

2. The storage processing device according to claim 1, wherein if there is more than one storage medium to which the identification information of the storage processing device is written, the boot processor selects as a boot drive the storage medium having the latest creation date of the system information stored therein from among the storage media.

3. The storage processing device according to claim 1, wherein if there is no storage medium to which the identification information of the storage processing device is written, the boot processor selects as a boot drive the storage medium having the latest creation date of the system information stored therein from among the plural storage media.

4. The storage processing device according to claim 2, wherein if there is more than one storage medium having the latest creation date of the system information stored therein, the boot processor selects as a boot drive the storage medium having an identification number that satisfies a predetermined condition, from among the storage media each having the latest creation date of the system information stored therein, the identification number allowing the recording medium to be uniquely specified in the storage processing device.

5. A non-transitory computer-readable medium including a program for causing a storage processing device to which plural storage media each storing system information are connectable to execute:
    selecting as a boot drive the storage medium to which identification information of the storage processing device is written by the storage processing device from among the plural storage media; and
    booting up the storage processing device on the basis of the system information stored in the boot drive thus selected, wherein
    the identification information of the storage processing device is a MAC address assigned to a communication interface of the storage processing device that is configured to communicate with devices external to the storage processing device.

6. A method performed by a storage processing device to which plural storage media each storing system information are connectable, the method comprising:
    selecting as a boot drive the storage medium to which identification information of the storage processing device is written by the storage processing device from among the plural storage media; and
    booting up the storage processing device on the basis of the system information stored in the boot drive thus selected, wherein
    the identification information of the storage processing device is a MAC address assigned to a communication interface of the storage processing device that is configured to communicate with devices external to the storage processing device.

* * * * *